United States Patent
Guo

(10) Patent No.: US 6,814,026 B2
(45) Date of Patent: Nov. 9, 2004

(54) MILKING PARLOR AND METHOD FOR INDIVIDUALLY PRESENTING ANIMALS TO BE MILKED VIA A TRANSLATING SHUTTLE STALL

(76) Inventor: Fangjiang Guo, 135 Simsbury Dr., Ithaca, NY (US) 14850

( * ) Notice: Subject to any disclaimer, the term of this patent is extended or adjusted under 35 U.S.C. 154(b) by 0 days.

(21) Appl. No.: 10/211,919

(22) Filed: Aug. 2, 2002

(65) Prior Publication Data

US 2004/0020440 A1 Feb. 5, 2004

(51) Int. Cl.$^7$ ................................................. A01K 1/12
(52) U.S. Cl. ............................... 119/14.02; 119/14.04; 119/520; 119/524
(58) Field of Search ..................... 119/14.03, 14.04, 119/520, 524, 729, 739, 14.02, 843

(56) References Cited

U.S. PATENT DOCUMENTS

| | | | |
|---|---|---|---|
| 3,536,045 A | | 10/1970 | Flocchini |
| 3,699,923 A | * | 10/1972 | Strom ..................... 119/14.04 |
| 3,792,686 A | | 2/1974 | Needham et al. |
| 3,810,442 A | | 5/1974 | Jacobs |
| 3,828,733 A | | 8/1974 | Correia |
| 3,877,419 A | | 4/1975 | Rodger |
| 3,937,297 A | | 2/1976 | Jacobs et al. |
| 4,006,712 A | | 2/1977 | Peel |
| 4,207,837 A | | 6/1980 | Schwartau et al. |
| 4,261,292 A | * | 4/1981 | Le Du ..................... 119/14.04 |
| 4,323,033 A | * | 4/1982 | Vosyka et al. ........... 119/14.04 |
| 4,419,961 A | | 12/1983 | Vandenberg et al. |
| 4,763,605 A | * | 8/1988 | Braum .................... 119/14.03 |
| 4,936,255 A | | 6/1990 | Pera |
| 5,000,119 A | | 3/1991 | Moreau et al. |
| 5,042,428 A | | 8/1991 | van der Lely et al. |
| 5,140,942 A | | 8/1992 | Flocchini |
| 5,285,746 A | | 2/1994 | Moreau |
| 5,392,731 A | | 2/1995 | Hoppman et al. |
| 5,469,808 A | | 11/1995 | Street et al. |
| 5,483,921 A | * | 1/1996 | Waybright ................ 119/14.02 |
| 5,507,247 A | * | 4/1996 | Tecza et al. ............. 119/14.03 |
| 5,638,768 A | | 6/1997 | Moreau |
| 5,768,997 A | | 6/1998 | Meier |
| 5,784,993 A | * | 7/1998 | Osthues et al. .......... 119/14.04 |
| 5,784,994 A | | 7/1998 | van der Lely |
| 5,959,526 A | * | 9/1999 | Tucker .................... 340/572.1 |
| 5,960,736 A | | 10/1999 | Ludington et al. |
| 6,050,219 A | | 4/2000 | van der Lely |
| 6,116,188 A | | 9/2000 | van der Lely |
| 6,161,502 A | | 12/2000 | Simpson et al. |
| 6,205,949 B1 | | 3/2001 | van den Berg |
| 6,394,027 B2 | * | 5/2002 | Gallagher et al. ....... 119/14.03 |

FOREIGN PATENT DOCUMENTS

FR        1310015        3/1963

OTHER PUBLICATIONS

English translation of Claims in French patent publication FR 1310015.

* cited by examiner

*Primary Examiner*—Charles T. Jordan
*Assistant Examiner*—John W. Zerr
(74) *Attorney, Agent, or Firm*—Brian B. Shaw, Esq.; Roger Aceto, Esq.; Harter, Secrest & Emery LLP

(57) ABSTRACT

A milking parlor having a plurality of translatable shuttle stalls allows for presentation of animals to be milked and corresponding release of the animals, independent of the milking status of additional animals. The shuttle stalls can be disposed in a herringbone or perpendicular orientation with respect to a corresponding operator pit, wherein the operator pit can accommodate human or robotic devices for implementing the milking process.

24 Claims, 6 Drawing Sheets

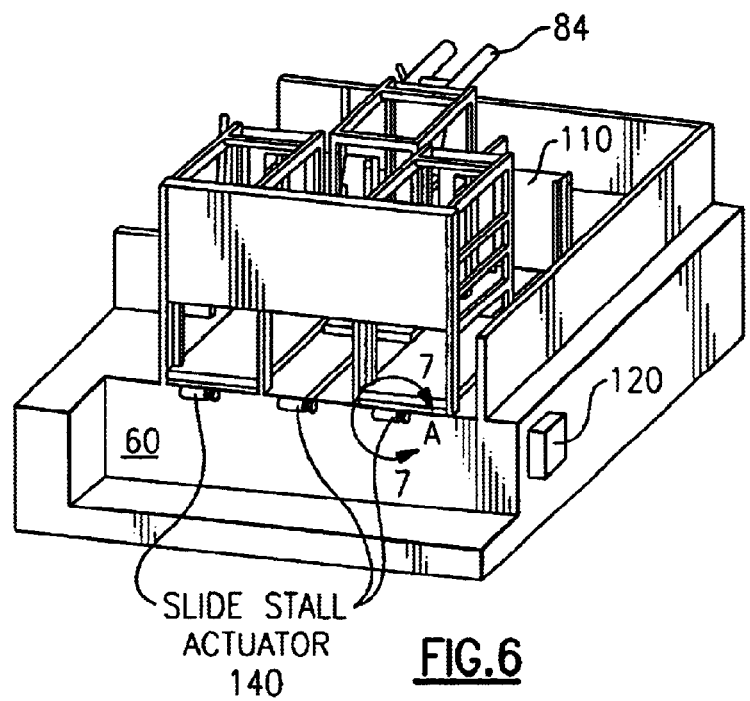
FIG.6
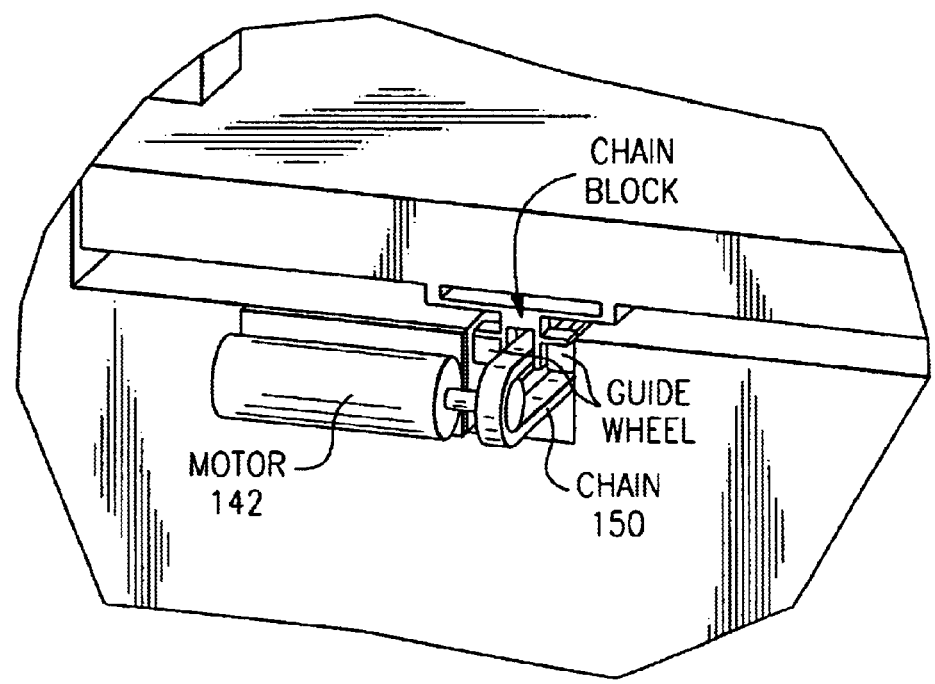
FIG.7   DETAIL A

MILKING PARLOR AND METHOD FOR INDIVIDUALLY PRESENTING ANIMALS TO BE MILKED VIA A TRANSLATING SHUTTLE STALL

FIELD OF THE INVENTION

The present invention relates to the presentation of an animal to be milked in a milking parlor, and more particularly, to the individual translation of a loaded shuttle stall from a loading position to a milking position.

BACKGROUND OF THE INVENTION

A milking parlor generally includes an array of individual milking stalls, each milking stall being designed to hold a cow or other dairy animal while being milked. Typically, an operator or milking robot is required to perform such tasks as insuring that the animals are properly situated in the milking stalls, washing the udder prior to milking, applying milking units; monitoring and attending to operation of the milking units and post dip the teats.

Generally, there are two principle ways to milk cows. One method is to bring the milking equipment to the cows while the cow is retained in a, often described as around the barn pipeline, or pipeline, tie-stall, and stanchion barn. The alternative method of milking cows is to bring the cows to the milking equipment. This arrangement is known as free-stall or milking parlor. There are several ways to configure the milking system.

Pipeline Milking System

In the pipeline milking system, each cow is confined to its own stall or stanchion (headlock device). In the stall, the cow is fed, watered and can lie down. The cow is restrained to the stall by tying (tie-stall) or stanchion.

A milk line is routed over the stalls along with a pulsator line and any electrical lines needed to operate corresponding milking units. Routing the milk line over the stalls is referred to as a high line. The milk line routes the milk to a milk room by gravity where the milk is pumped into a bulk tank. Ports or stall cocks are located between the stalls to which individual milking units connect.

In operation, the operator takes the milking unit to the stall and operably connects the milking unit to the stall cock. The milking unit is then applied to the cow. In this configuration, the operator attaches milking unit from one side of the cow and in between two adjacent two cows.

When the cow has been milked out, the operator removes the unit and applies it to the next cow, moving the unit from stall cock to stall cock as the process moves throughout the barn.

As with any system, there are efficiency benefits and drawbacks to the pipeline milking system. One benefit is that the system allows the operator to prepare the next cow for milking while the previous cow is being milked. When the first cow is finished milking, the unit can be immediately moved to the prepared next cow. However, the pipeline system induces significant operator fatigue. The milking process requires the operator to bend over or squat down to access the udder for preparing, milking and post dipping. There is also considerable freedom for the cow to move around within the stall, which results in milking units being kicked off or stepped on. Immediate attention is required by the operator upon a milking unit being kicked off or stepped on. Further, there is little to protect the operator from being kicked or stepped on. As each stall requires a corresponding stall cock, a large number of stall cocks are employed and any percentage of failure or leakage results in required maintenance. Further, some portions of the milk line may be soiled by milk and not cleaned for hours, as the milking process has moved to another part of the barn. Also, the relatively long pipe lengths cause hot washing water to cool very quickly. In addition, once the milk has been extracted from the cow, it must be lifted to the pipeline running above the stall. Typically, this elevating process is done with the same vacuum used to extract the milk. Thus, a stable vacuum at the cow teats is very difficult to achieve. Although automation devices such as milk meters and automatic take-offs have inherent individual benefits, it is difficult to implement these devices as they must be carried from cow to cow and secured to each stall.

Parlor Milking System

In the parlor milking system, each cow has a stall where it can lay down, however, the cows are not restrained to the stall and may move about the barn (free stall). For milking, the cows are gathered and taken to the milking parlor. Fences or gates form the milking stalls of the milking parlor and control the flow and position of the cows in the parlor. The fences and gates also serve to protect the operator from getting kicked or stepped on. Typically, the milking stalls are considerably smaller than those found in free stalls or tie stalls, as it is not intended that the cows lay down in the milking stall. This closer confinement reduces freedom of movement of the cow and results in less kick off of the milking unit. As the milking equipment is not manually moved from cow to cow, automatic take offs and milk meters can be permanently mounted and utilized efficiently in the milking parlor system.

Herringbone Milking Parlor—Batch Operation

The herringbone-milking parlor includes two rows of milking stalls separated by an operator pit. The milking stalls arrange the cows for milking from the side. The cows enter the milking parlor in a single file and turn at an angle away from the operator pit. The cows overlap each other and thus form a herringbone pattern. The operator works from the pit, which is a lowered area between the opposing rows of milking stalls. In the lowered operator pit, the operator is able to stand upright and attend to the cows without having to bend or squat down. The milk line is located along a side of the operator pit or in a basement below the parlor floor and is lower than the cow udder. This configuration provides for more stable vacuum at the teats, as the milk is not lifted by vacuum. Locating the milk line lower than the cow's udder is referred to as a low line system. However, as this herringbone parlor is a batch processing, when the first cow is finished milking it must wait until all the cows in the batch are finished before the cow can leave. Therefore, inefficiencies are encountered as milked cows in a batch cannot be replaced until the last cow in the batch has been processed.

Tandem Parlor—Batch or Single Operation

The tandem parlor also includes two rows of milking stalls separated by an operator pit. The milking stalls are arranged for milking the cows from the side. The cows enter the milking parlor single file and stop without turning away from the operator pit. This configuration requires a much longer milking parlor than other milking parlors having the same capacity. Adjacent milking units in the tandem parlor are spaced by the length of a cow This long spacing between milking units causes the tandem parlor to have a long walking distance for both animals and operators. Known variations of this arrangement allow each stall to have its own entrance and separate exit gate thereby allowing the operator to release a cow when it is finished and let a new cow into that stall even though the rest of the cows in that side are still milking. Typically, the tandem parlor also employs a low line.

Parallel Parlor—Batch Operation

A parallel parlor also includes two rows of milking stalls separated by an operator pit. The milking stalls arrange the cows for milking from between the rear legs. The cows enter the parlor in a single file and turn perpendicular to the operator pit in a parallel cow-to-cow orientation. The parallel parlor allows for a very short milking parlor with each milking unit being spaced by only a cow width from the next adjacent milking unit. Further, since the milking is done from between the rear legs, the milking equipment is located where manure would fall upon it. A gutter is required to catch the manure before it can soil the milking equipment. The cows tail can also hinder milking from between the rear legs. Often trimming or docking the tail enhances efficiency of the parallel parlor.

Flat Barn Parlor—Single Operation

The flat barn-milking parlor includes one or two rows of milking stalls with no recessed operator pit or an elevation change in the milking parlor that can be handled by the cow stepping up. It is similar to the pipeline type arrangement, wherein, the operator milks the cows from the side and thus the operator must bend or squat to access the udder. Like the pipeline type arrangement, the operator has to attach milking units to the cow in between two adjacent cows. It is difficult to attach the milking unit from behind in between two rear legs of the cow. The operator can be easily soiled or wetted by the cow. The front quarters of the teat is hard to reach from behind.

Because there is no recessed operator pit, the cows can enter the milking stalls from the rear of the stall without having to move in a single file. This allows the operator to release a cow from the stall as soon as the cow is finished milking. The next cow may be then introduced into the milking stall from the rear of the milking stall. Some flat barn parlors have small recessed operator pits at each milking station where the operator steps down into the pit and does not have to bend over as far to milk the cow. Typically, these pits are located in between two adjacent milking stalls and do not run the length of the milking parlor and to reach more than two cows, the operator must step up out of one pit and step down into the next pit. Most flat barn parlors use a high line as cow traffic prevents the use of a low line. However, the operator walking distance in a flat barn parlor is longer than other parlor arrangements of equal capacity. That is, the stalls are arranged either in a single row, or the two rows of stalls are far enough apart to allow cow traffic between the rows. The flat barn parlor induces operator fatigue from the long walking distance and the need to either bend or squat to access the udder or climb in and out of individual recessed operator pits.

Rotary Parlor—Single Operation

In an effort to overcome the considerable time for cows to enter and fill the milking parlor in the herringbone and parallel parlor configurations, the rotary parlor is employed. The rotary parlor does not load and release cows in groups as do the herringbone and parallel arrangements. In contrast, the rotary parlor arranges a herringbone, tandem or parallel type stalls around a moving platform. When an empty stall passes the loading gate, a cow forwardly moves into the empty stall. The cow is milked either from the side or between the rear legs, depending upon the milking stall arrangement, as the milking parlor continues to rotate. Prior to reaching the entrance gate, where the cows are introduced, the milked cow is exposed to an exit gate. The speed of the rotation of the parlor is usually set such that cows requiring the longest time for milking are finished milking before reaching the exit gate.

However, there is no provision for releasing a cow as soon as the cow is finished and replacing the then empty milking stall with a fresh cow.

In most rotary parlors, the operator(s) can not see all of the animals in the parlor. A unit fall off may go undetected until an operator post dips the animal. If the operator detects a condition that requires immediate attention, they must chase the stall to remedy the situation.

The rotary parlor prevents the operator from having to wait for groups of cows to load into the parlor, but cows having a milking time that is less than the rotation time, must still wait before they can exit the parlor.

The rotary parlor uses a low line. However, the rotation of the rotary parlor requires a multitude of moving parts and enhanced complexity to install and service. For example, service connections to the parlor, including plumbing, vacuum, communications and electrical must be dynamic.

Therefore, a need still remains to enhance the efficiency in milking cows by eliminating idle time for both the operator and the equipment. The need exists for a method of presenting animals to be milked, wherein milking equipment and associated automation devices allow the operators to milk more cows faster than in a conventional milking system. The further need exists for enhancing ergonomic working conditions for operators.

SUMMARY OF THE INVENTION

The present milking parlor provides for individual sequencing of animals to be milked and presentation of the animals to an operator in an operator pit, wherein the individual animals can be presented in a herring bone pattern or orthogonal to the operator pit, thereby allowing milking from the rear or the side of the animal.

The present milking parlor also allows the continuous presentation of animals to be milked, without the inherent restrictions of batch or group processing.

The milking parlor includes a plurality of shuttle stalls intermediate a holding area and a release area. Each shuttle stall is individually movable from a loading position, to a milking position adjacent to an operator pit, and then to an unloading position. In one configuration, each shuttle stall is individually controlled for receiving and presenting a corresponding animal to the operator pit.

In a further configuration, each shuttle can include at least two milking stalls, such that a corresponding number of animals can be loaded into corresponding milking stalls.

In a further configuration, the plurality of shuttle stalls can move simultaneously, but independently, between a loading position, a milking position adjacent to an operator pit, and an unloading postion.

In a further configuration, the milking parlor employs a plurality of corresponding alley gates to at least partially define a travel path of an animal from the holding area to an unoccupied shuttle stall in the loading position.

BRIEF DESCRIPTION OF THE DRAWINGS

FIG. 6 is a perspective view showing a representative actuating mechanism for translation of the shuttle stalls.

FIG. 7 is an enlarged detail view showing a representative mechanism for translation of the individual shuttle stalls.

DETAILED DESCRIPTION OF THE PREFERRED EMBODIMENT

Figure 1:
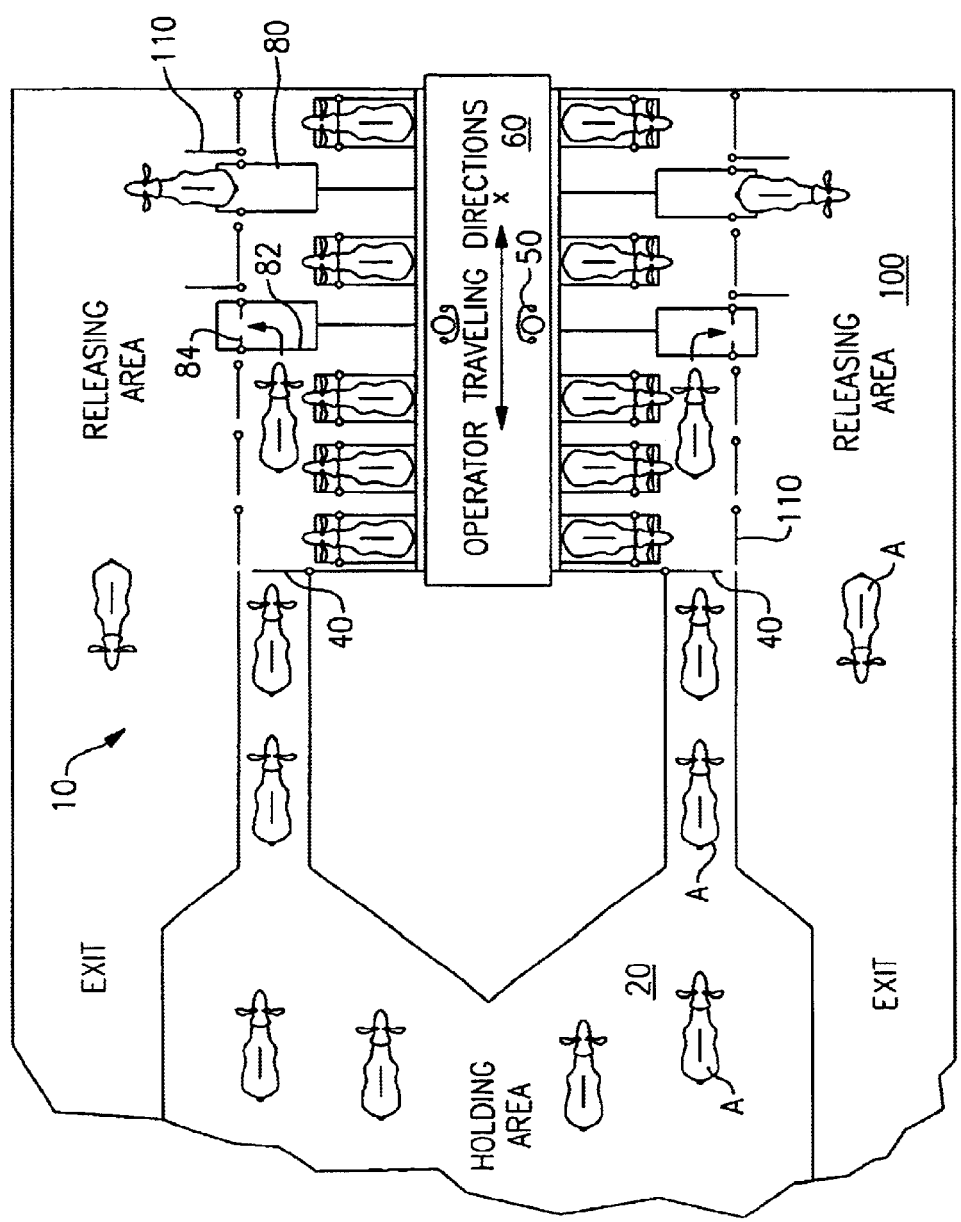
FIG. 1 is a top plan view of a milking parlor employing a plurality of shuttle stalls.

The present system provides a milking parlor 10 for milking a plurality of animals A on a continuous, individual basis, without encountering the inherent limitations of batch processing.

As used herein, the term "rear milking" means accessing the teats from between, or through the rear legs of the animal A. The term "side-milking" means accessing the udders from between the front leg and the rear leg along one side of the animal A.

Although the present system is described in terms of presenting the animal to be milked, and specifically of milking cows, it is understood the system is applicable to any domesticated milk producing animal including, but not limited to goats, sheep, bison, llamas and yaks. For the purpose of clarity the term "animal to be milked" is shortened to "the animal."

The term "loading" the animal A into a stall means introducing the animal into the stall. In contrast, the term "unloading" the animal from a stall means extracting the animal from the stall.

The modifier "forward" or "forwardly" when used in connection with the animal means the animal proceeding in a direction of travel being led by its head. The modifier "rearward" or "back" when used in connection with the animal A means a direction of travel that is led by the tail or hind legs of the animal.

In this configuration, the term "back" or "rear" end of a respective stall means that end which is adjacent the hind quarters or rear legs of the animal A upon the animal being operably retained within the stall. A front or forward end of the stall corresponds to that end of the stall adjacent the front legs or head of the animal A upon being operably retained in the stall.

The milking parlor 10 includes a holding area 20, at least one holding gate 40, an operator pit 60, at least one shuttle stall 80 and a release area 100, to define a processing path from the holding area through the holding gate, into a translatable shuttle stall; along a translation of the shuttle stall and to the release area. In one configuration, the milking parlor 10 also includes alley gates 110 for assisting in guiding the animal from the holding gate 40 to a shuttle stall 80 in the loading position. Optionally, the milking parlor 10 can include or be operably connected to a controller 120. The controller 120 is a processor or microprocessor such as a computer, laptop computer or dedicated processor.

Prior to milking, the animals A are temporarily retained within the holding area 20. The holding area 20 defines a space in which the animals are collected from free stalls, grazing or other non-milking activity. The holding area 20 is preferably connected to at least one holding gate 40 by a converging chute. The chute directs and limits animal travel to a linear single file procession. The chute can funnel animal traffic to a single holding gate 40. Alternatively, a given chute can funnel animals to a plurality of holding gates 40.

The holding gate 40 can be any of a variety of configurations including horizontally or vertically swinging gates as well as a vertically or horizontally translating gate. That is, the holding gate 40 can be a swing gate, a slide gate or a lift gate. The particular type of gate, actuating mechanism and control of the gate is at least partially determined by the intended through put of the milking parlor 10 as well as the type of milking machine and operator.

The holding gate 40 is movable between an opened and a closed position. Movement of the holding gate 40 between the opened and the closed position can be provided by human or automated actuators. The actuators include, but are not limited to pneumatic, gear, chain, and hydraulic or biased actuators. The actuators can be manually or automatically triggered. That is, sensors (not shown) can be operably located relative to the holding gate to provide a signal for opening or closing the entrance and holding gates. Available sensors include position, location, pressure, weighing sensors, as well as process sensors connected to the milking system. Process sensors include senses that determine termination of the milking process in a corresponding shuttle stall and positioning of the shuttle stall in the loading position. The actuators and sensors can be operably connected to the controller 120 for regulating the opening and closing of the holding gate.

The operator pit 60 is located adjacent a rear of the shuttle stall 80 in the milking position and can be at the same elevation as the shuttle stall. Alternatively, the operator pit 60 can be recessed, or at a lower elevation than the shuttle stall 80.

In one configuration, the operator pit 60 is disposed at a lower elevation than a floor of the shuttle stall 80. The recessed configuration helps reduces operator fatigue.

The operator pit 60 is configured to permit rear milking of the animal A, upon confinement of the animal to the shuttle stall 80 and positioning of the milking stall in the milking position. An operator 50 is disposed in the operator pit 60 to attend the milking process, including operating a milking machine. The operator 50 can be a human or a robotic device. It is contemplated the operator can be a human operator or a robotic operator, without effecting the scope of the present invention. Thus, the operator pit 60 can include any of a variety of commercially available robotic milking machines. Alternatively, the operator pit 60 is configured for human operators.

The dimensions of the operator pit 60 is at least partially determined by intended operator 50. That is, if a robotic operator 50 is employed the dimension can be minimized.

The operator pit 60 can further include a mobile platform (not shown) translatable across a rear end of the plurality of shuttle stalls 80 in the milking position to allow access to the rear of the animal A retained in the respective shuttle stall. This allows the operator 50 to prepare the teats and attach the milking unit without incurring significant stress or fatigue. In one configuration, the mobile platform travels along a rail or set of rails (not shown) adjacent the rear end of the shuttle stalls 80 in the milking position.

In one configuration, employing a robotic operator, the shuttle stall 80 in the milking position is accessible to a milking claw moveable between a retracted position and an elevated milking position. The milking claw is fluidly connected to the milking line by a hose, hoses or pipe. Preferably, the connection of the milking claw to the milking line is flexible, so that the milking claw has a range of motion along the longitudinal and lateral dimension of the milking stall. A robotic arm (not shown) can selectively raise the milking claw to engage the animal A and begin the milking process. Thus, the robotic actuating arm can be operably associated with each shuttle stall 80. Alternatively, the robotic arm is moveable across the rear end of the shuttle stalls 80, so that a single robotic arm can be used to selectively elevate a plurality of milking claws.

The robotic device can translate along a rail or set of rails for alignment with a respective shuttle stall 80. The actuating arm is moveable through at least one and typically three degrees of freedom for operably locating a milking claw relative to the teats. The actuating arm can be moved by any of a variety of mechanisms known in the art, including, but not limited to, hydraulics, pneumatics, servos, gearing, linkages and motors. In the rear milking configuration, the robotic device operably locates and elevates the milking claw along a path between the rear legs of the animal A.

The shuttle stall 80 can be oriented perpendicular to the adjacent portion of the operator pit 60, or inclined (angled) relative to the operator pit, such as a herringbone pattern.

The shuttle stall 80 is sized to confine the animal A to a generally predetermined and fixed location in the stall. That is, the animal A is not permitted to lay down, and has restricted lateral tolerance. Typically, the shuttle stall 80 is sized to retain a single animal. However, it is understood the shuttle stall 80 can be sized to retain a plurality of animals, such as 2, 3, 4, 5 or more. Thus, relatively small batches of animals can independently be presented for milking.

Each shuttle stall 80 includes a floor and a surrounding pen, wherein the shuttle stall defines a longitudinal axis. The longitudinal axis also defines a long axis of the animal. That is, the head and tail of the animal are located along the longitudinal axis upon being operably loaded in the shuttle stall 80. Alternatively stated, the animal defines a long axis running along the spine of the animal from the head of the tail.

The pen of the shuttle stall 80 is typically formed to include an ingress gate 82 and an egress gate 84. The ingress gate 82 is located to permit passage of the animal from a path at least partially defined by the alley gates 110 into the shuttle stall 80, and the egress gate 84 is located to permit selective passage from the shuttle stall to the release area 100.

As seen in FIGS. 2–5, in one configuration, the ingress gate 82 of the shuttle stall 80 is a swing style gate. The ingress gate 82 can be located to permit entry of the animal through either the rear or a side of the shuttle stall 80.

The ingress gate 82 can be lifted by any of a variety of mechanisms including, but not limited to pneumatic, gear, chain, motor, servos, hydraulic or biased actuators. Further, though the ingress gate 82 can be a lift gate, it is understood the ingress gate can be any of a variety of configurations including horizontally or vertically swinging gates as well as vertically or horizontally translating gates. That is, the ingress gate 82 can be a swing gate, a slide gate or a lift gate. The particular type of gate, actuating mechanism and control of the gate can be at least partially determined by the shuttle stall configuration as well as the type of milking unit and operator.

Preferably, the egress gate 84 is a headlock gate and located at a front end of the shuttle stall 80 to provide selective passage from the shuttle stall to the release area.

Further, the headlock gate is moveable from a release position to a retaining position, wherein the headlock gate can preferably assume any of a plurality of retaining positions. The use of a plurality of retaining positions allows the shuttle stall 80 to accommodate various animal sizes so as to locate the rear (and teats) of the animal in a generally predetermined position with respect to the rear of the shuttle stall and hence the operator pit 60.

It is understood the egress gate 84 of the shuttle stall 80 can be any of a variety of configurations including horizontally or vertically swinging gates as well as vertically or horizontally translating gates. That is, the egress gate 84 can be a swing gate, a slide gate or a lift gate.

The ingress and egress gates 82, 84 are movable between an open and a closed position. Movement of the ingress and egress gates 82, 84 between the open and the closed position can be provided by human or automated actuators. The actuators include, but are not limited to pneumatic, gear, chain, and hydraulic or biased actuators. The actuators can be manually or automatically triggered. That is, sensors can be operably located relative to the shuttle stall to be provide a signal for opening or closing the ingress and egress gates 82, 84. Available sensors include position, location, pressure sensors, as well as process sensors connected to the milking system. One such sensor could indicate the termination of the milking process. The actuators and sensors can be operably connected to the controller 120 for regulating the opening and closing of the ingress and egress gates 82, 84 as well as position of the shuttle stall among the loading, milking, and unloading positions.

In further configurations, it is contemplated the shuttle stall 80 can be associated with or include a milk meter. The milk meter can be connected to the milking claw or the milking line and the controller through a wired or wireless connection. The milk meter is known in the industry and typically includes a microprocessor and sensors for determining milk yield, milk temperature, milk conductivity, cow connection status, which data is transmitted to the controller 120.

Each shuttle stall 80 is individually and selectively moveable from a loading position to a milking position adjacent the operator pit 60, and from the milking position to an unloading position. In a preferred configuration, the unloading position is the loading position of the shuttle stall 80. It is understood, more than one shuttle stall can be moved simultaneously.

Although it is understood each shuttle stall 80 can move along intersecting linear paths or a curvilinear path, a preferred configuration, the travel of the shuttle stall is a straight linear path. Thus, the shuttle stall 80 moves forward and backward along a corresponding path on a single axis.

Referring to FIGS. 6 and 7, each shuttle stall 80 is connected to a drive mechanism for selective movement between the loading position, the milking position and the unloading position. The drive mechanism can be operably connected to the controller 120 by a hard wires or wireless connection. In one configuration, each shuttle stall 80 is associated with a corresponding drive mechanism 140. Each drive mechanism 140 can include a coupler 150 connected to the shuttle stall 80 and a motor 142 connected to the coupler. The coupler 150 can be any of a variety of configurations including belts, chains, screw drives and linkages. The motor 142 can also be any of a variety of devices, including but not limited to electric, hydraulic, pneumatic or magnetic.

It is also contemplated the acceleration and velocity of the each shuttle stall 80 can be controlled by the controller 120, at least partially in response to the type of animal retained in the shuttle stall and the configuration of the given milking parlor 10.

The shuttle stall 80 can be operably disposed by operator power, chain drives, hydraulic drives, pneumatic drives or electric motors. Initiation of shuttle stall translation can be by manual or automatic control. For manual control, the operator verifies the occupancy status of the shuttle stall in the unloading position, and opens the ingress gate 82. In an automatic system, the controller 120 may receive signals from shuttle stall sensors indicating the empty or occupied status of a shuttle stall, as well as the position of the shuttle stall. The controller 120 can thus locate the shuttle stall 80 to receive an animal A, translate the shuttle stall to the milking position adjacent the operator pit 60. It is also contemplated the controller 120 can operate the ingress and the egress gates 82, 84 of the shuttle stall 80.

The milking parlor 10 further includes the plurality of alley gates 110 corresponding to the number of shuttle stalls 80. The alley gates 110 are generally fixed such that the shuttle stalls 80 move relative to the alley gates.

The alley gates 110 are moveable between a retracted position and a guiding position. In the guiding position, the alley gates direct the animal along a travel path toward the first available shuttle stall in the loading position.

Movement of the alley gate between the retracted and the guiding position can be accomplished by a variety of mechanisms including actuators as previously described as well as a combination of bias mechanisms and movement of the shuttle stall 80. That is, as the shuttle stall 80 moves from the milking position to the unloading position, the shuttle stall may urge the corresponding alley gate to the retracted position. The egress gate 84 opens and the processed animal then exits to the release area. Upon moving the egress gate to the closed position and the ingress gate to the open position, an animal can be loaded onto the shuttle stall. Upon movement of the then loaded shuttle stall 80 to the milking position, the associated bias mechanism with the alley gate returns the alley gate to the guiding position.

Thus, the processing path for an animal A through the milking parlor 10 includes being retained in the holding area 20 by the holding gate 40 by closure of the gate, passing from the holding gate 40, and through a path defined by the alley gates 10 and shuttle stalls 80 in the milking position, through the ingress gate 82 of the shuttle stall 80, in the loading position being retained within the shuttle stall through closure of the shuttle stall ingress gate, and translating the shuttle stall to the milking position, then subsequent translation of the shuttle stall to the unloading position and subsequently passing from the shuttle stall through the egress gate 84 of the stall.

Operation

In operation, the animals A are directed to the holding area 20. The animals A are then urged or guided to holding gate 40. Depending upon the specific configuration of the milking parlor 10, the animal A is retained in the holding gate 40 in the closed position.

Figure 2:
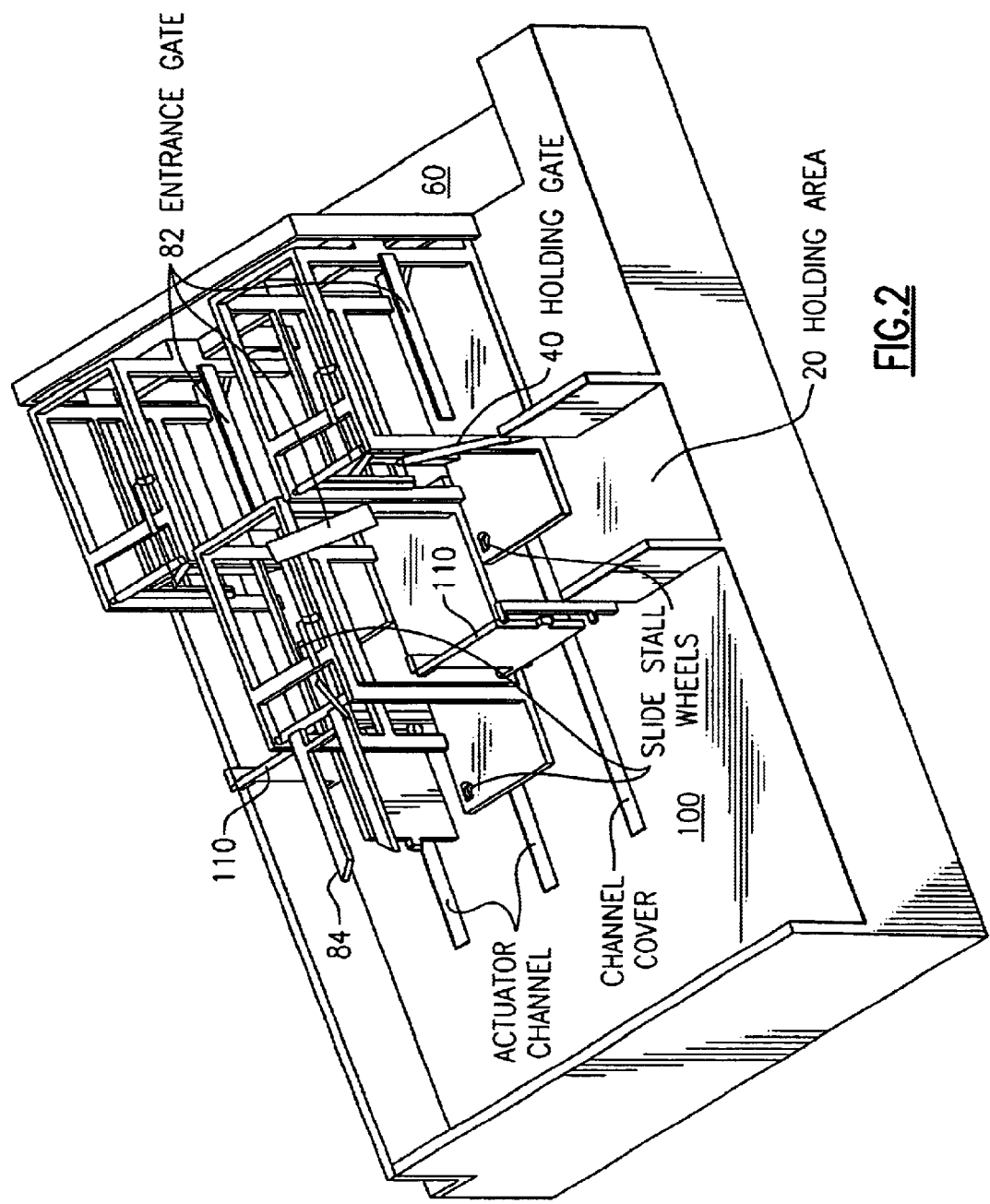
FIG. 2 is a left perspective view of a plurality of shuttle stalls in relation to the holding area and the release area.
Figure 3:
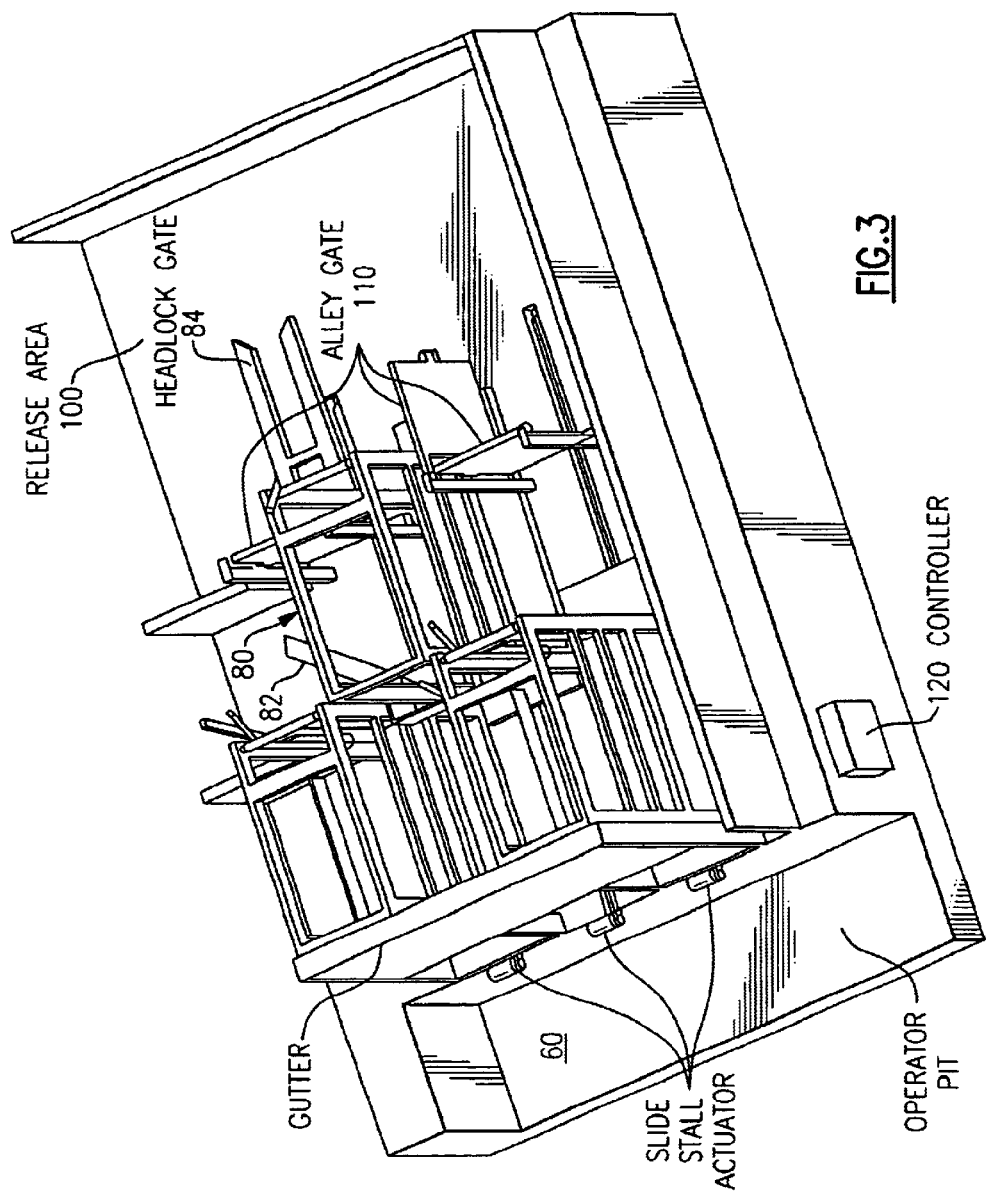
FIG. 3 is a right perspective view of a plurality of shuttle stalls in relations to the holding area and the release.
Figure 4:
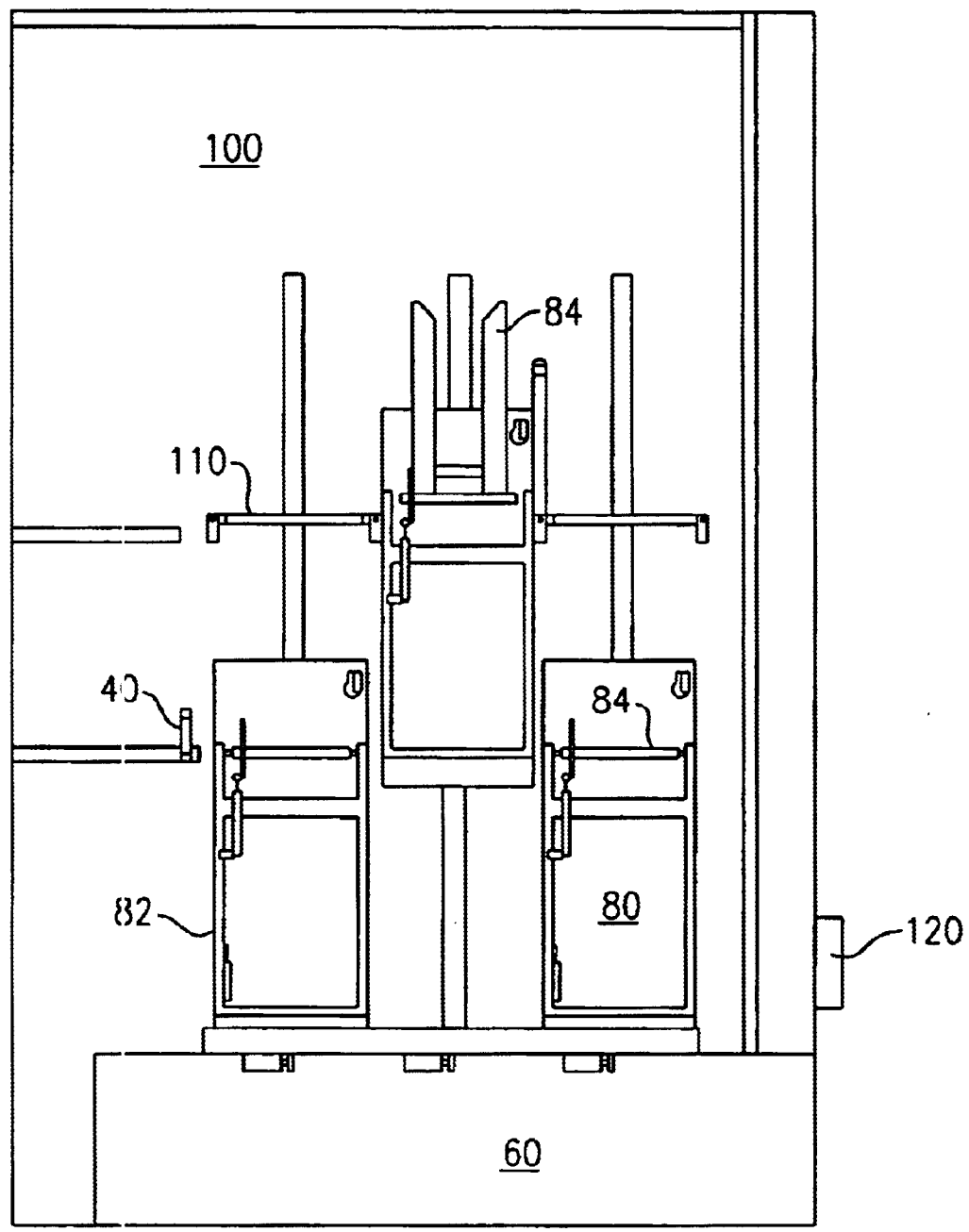
FIG. 4 is a top plan view of the milking parlor of FIG. 3.
Figure 5:
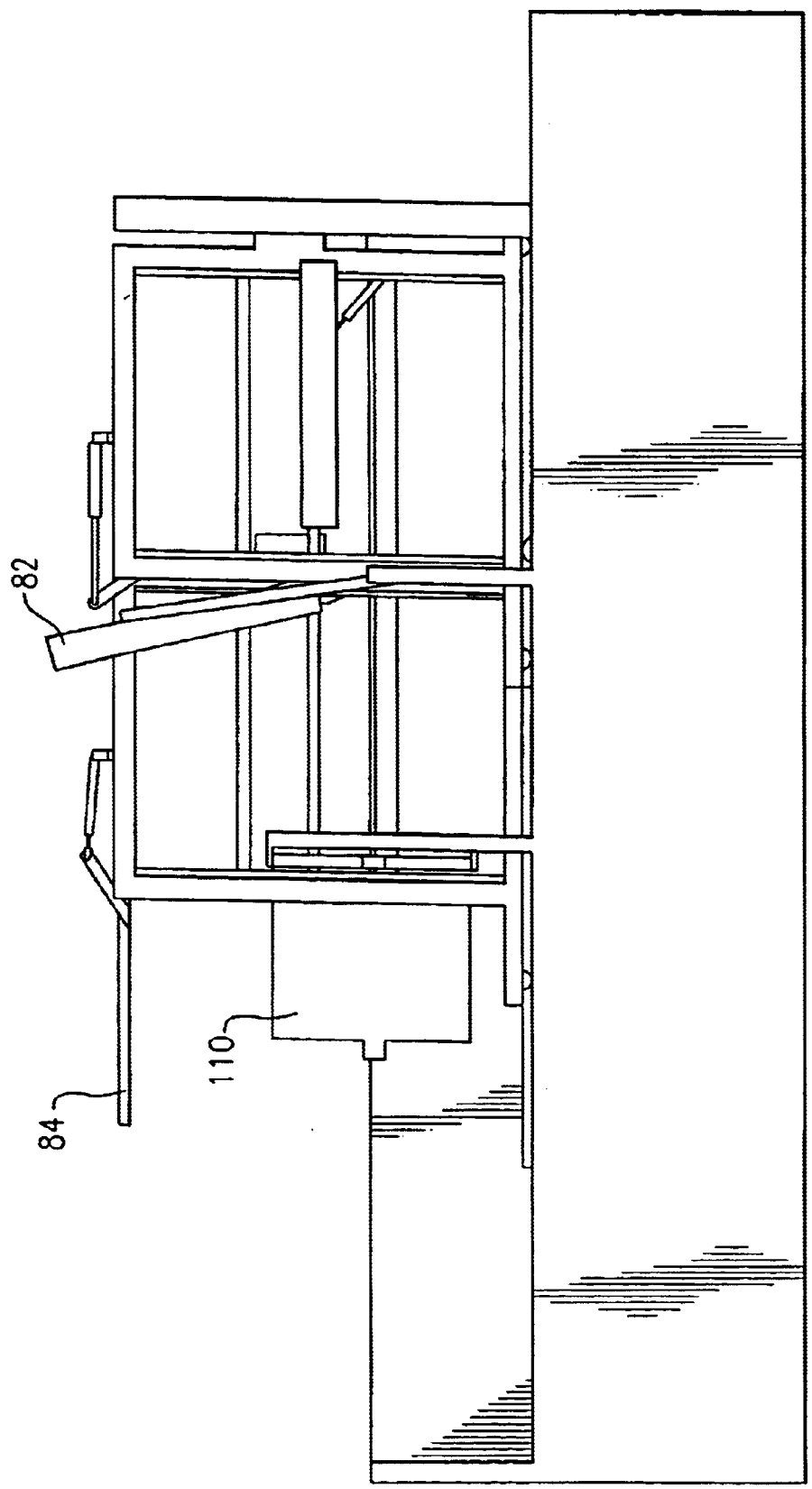
FIG. 5 is a side elevation view of the milking parlor of FIG. 4.

Upon at least one given shuttle stall 80 becoming unoccupied, the shuttle stall is either in or moves to the loading position with the headlock gate 84 in a retaining position and the ingress gate 82 in the open position. As seen in FIGS. 1–3, the alley gates 110 intermediate the unoccupied shuttle stall 80 and the holding gate 40, in conjunction with the egress (headlock gate) of the intermediate shuttle stalls define a travel path from the holding gate 40 to the unoccupied shuttle stall in the loading position.

The animal A then walks from the holding gate 40 along the path defined by the alley gates and the corresponding shuttle stalls in the milking position, to the unoccupied shuttle stall 80 in the loading position.

The animal A then enters the shuttle stall 80 in the loading position through the ingress gate either on the side of the shuttle stall or the rear of the shuttle stall, as dictated by the location of the ingress gate 82.

The ingress gate 82 is then closed and the headlock (egress) gate is moved to the retaining position or to a more fully retaining position.

The loaded shuttle stall 80 is then translated from the loading position to the milking position to thereby operably retain the animal relative to the operator pit 60.

The milking procedure occurs.

Upon termination of the milking process, the shuttle stall 80 is translated to the unloading position, thereby moving the associated alley gate 110 to the retracted position. The egress gate 84 (headlock gate) is moved to the open position and the animal A walks from the shuttle stall to the release area.

In one configuration, the loading position and unloading position can be the same, wherein the milking position is spaced from loading/unloading position.

To receive the next animal A, the egress gate 84 can be moved to the closed position and the ingress gate 82 disposed in the open position and the process is repeated.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

I claim:

1. A method for presenting an animal to be milked, comprising:
    (a) individually moving, solely along an axis including a head and tail of the animal and extending transverse a longitudinally extending operator pit, a loaded shuttle stall from an animal loading position away from the operator pit to a milking position placing the rear of the animal adjacent the operator pit.

2. The method of claim 1, further comprising loading at least one animal onto the shuttle stall in the loading position through an open side of the shuttle stall.

3. The method of claim 1, further comprising loading at least one animal onto the shuttle stall in the loading position through an open end of the shuttle stall.

4. The method of claim 1, further comprising moving a headlock gate from an open position to a retaining position.

5. The method of claim 1, wherein individually moving a loaded shuttle stall from a loading position to a milking position includes travel along a linear path.

6. The method of claim 1, further comprising moving the shuttle stall in response to a control signal from a controller.

7. A milking parlor for presenting an animal to be milked, comprising:
    (a) a plurality of individually moveable shuttle stalls arranged along a longitudinally extending operator pit, each shuttle stall individually moveable solely along an axis including a head and a rear of the animal in a direction extending transverse the longitudinally extending operator pit, from an animal loading position away from the operator pit to a milking position placing the rear of the animal adjacent the operator pit.

8. The milking parlor of claim 7, further comprising a controller for selectively moving the shuttle stalls between the loading position and the milking position.

9. The milking parlor of claim 7, wherein each shuttle stall includes an ingress gate.

10. The milking parlor of claim 9, wherein the ingress gate is located along a side of the shuttle stall.

11. The milking parlor of claim 7, wherein each shuttle stall includes a headlock gate.

12. The milking parlor of claim 11, wherein the headlock gate is moveable between a release position and a retaining position.

13. The milking parlor of claim 12, wherein the headlock gate is selected to be disposed in any of a plurality of retaining positions.

14. The milking parlor of claim 7, further comprising at least two independently moveable shuttle stalls.

15. A method for presenting an animal to be milked, comprising:
 (a) moving one of a plurality of individually moveable shuttle stalls away from a longitudinally extending operator pit to a loading position, movement of the shuttle being along an axis including a head and tail of an animal and extending in a direction transverse an elongated operator pit;
 (b) loading an individual animal head first into the shuttle stall with the rear of the animal oriented towards the operator pit; and
 (c) individually moving the loaded shuttle stall along the axis to a milking position placing the rear of the animal adjacent the operator pit.

16. The method of claim 15, further comprising simultaneously moving at least two shuttle stalls.

17. A method for presenting an animal to be milked, comprising:
 (a) loading at least two animals into one of a plurality of stalls arranged along an elongated operator pit with the head of each animal oriented away from the operator pit; and
 (b) moving the shuttle stall, along an axis including a head and tail of one of the animals solely in a direction extending transverse the operator pit, to a milking position placing the rear of the animal adjacent the operator pit.

18. The method of claim 17, further comprising simultaneously moving a plurality of shuttle stalls.

19. A milking parlor for presenting an animal to be milked, comprising:
 a) a plurality of individually moveable shuttle stalls, each of the shuttle stalls moveable along an axis including a head and a rear of the animal, from a loading position to a milking position adjacent an operator pit and from the milking position to an unloading position; and
 b) the unloading position is the loading position.

20. A milking parlor for presenting an animal to be milked, comprising:
 a) a plurality of individually moveable shuttle stalls, each of the shuttle stalls moveable along an axis including a head and a rear of the animal, from a loading position to a milking position adjacent an operator pit; and
 b) each of the shuttle stalls including an ingress gate located along a rear of the shuttle stall.

21. A milking parlor for presenting an animal to be milked, comprising:
 a) a plurality of individually moveable shuttle stalls, each of the shuttle stalls moveable along an axis including a head and a rear of the animal, from a loading position to a milking position adjacent an operator pit; and
 b) a plurality of alley gates, each alley gate being spaced from a corresponding shuttle stall in the milking position.

22. The milking parlor of claim 21, wherein the alley gates are moveable between a retracted position and a guiding position.

23. The milking parlor of claim 22, wherein the alley gate is moved to the retracted position upon a corresponding shuttle stall being disposed in an unloading position.

24. The milking parlor of claim 22, further comprising an actuator connected to a selected alley gate to move the selected alley gate to one of the retracted position and the guiding position.

* * * * *